US007619908B2

United States Patent
Hofmeister et al.

(10) Patent No.: US 7,619,908 B2
(45) Date of Patent: Nov. 17, 2009

(54) PROGNOSTIC HEALTH MONITORING IN SWITCH-MODE POWER SUPPLIES WITH VOLTAGE REGULATION

(75) Inventors: James P Hofmeister, Tucson, AZ (US); Justin B Judkins, Tucson, AZ (US)

(73) Assignee: Ridgetop Group, Inc., Tucson, AZ (US)

( * ) Notice: Subject to any disclaimer, the term of this patent is extended or adjusted under 35 U.S.C. 154(b) by 295 days.

(21) Appl. No.: 11/778,835

(22) Filed: Jul. 17, 2007

(65) Prior Publication Data
US 2008/0015795 A1    Jan. 17, 2008

Related U.S. Application Data

(60) Provisional application No. 60/831,310, filed on Jul. 17, 2006.

(51) Int. Cl.
  *H02M 7/10* (2006.01)
  *G05F 1/40* (2006.01)
(52) U.S. Cl. .......................... 363/50; 323/285
(58) Field of Classification Search ............... 363/50, 363/55, 56.01; 323/268, 271, 282, 283, 285; 324/415, 416, 511, 537, 753, 765, 771, 76.39, 324/76.44; 361/18
See application file for complete search history.

(56) References Cited

U.S. PATENT DOCUMENTS

| 4,245,289 | A | 1/1981 | Mineck et al. |
| 4,531,065 | A | 7/1985 | Nakayama et al. |
| 6,011,414 | A | 1/2000 | Majid et al. |
| 6,281,673 | B1 * | 8/2001 | Zoellick et al. ............. 324/133 |
| 6,703,893 | B1 * | 3/2004 | Isham ......................... 327/538 |
| 6,712,048 | B2 * | 3/2004 | Aoki et al. .................. 123/490 |
| 6,873,204 | B2 | 3/2005 | Matsuda |
| 7,154,254 | B2 | 12/2006 | Bray |
| 7,173,446 | B2 | 2/2007 | Isakharov et al. |

OTHER PUBLICATIONS

Lahyani, et al, "Failure Prediction of Electrolytic Capacitors during Operation of a Switchmode Power Supply", IEEE Transactions on Power Electronics, vol. 13, No. 6, pp. 1199-1207, Nov. 1998.

* cited by examiner

*Primary Examiner*—Matthew V Nguyen
(74) *Attorney, Agent, or Firm*—Hayes Soloway P.C.

(57) ABSTRACT

The system includes a current injection device in electrical communication with the switch mode power supply. The current injection device is positioned to alter the initial, non-zero load current when activated. A prognostic control is in communication with the current injection device, controlling activation of the current injection device. A frequency detector is positioned to receive an output signal from the switch mode power supply and is able to count cycles in a sinusoidal wave within the output signal. An output device is in communication with the frequency detector. The output device outputs a result of the counted cycles, which are indicative of damage to an a remaining useful life of the switch mode power supply.

25 Claims, 9 Drawing Sheets

PROGNOSTIC HEALTH MONITORING IN SWITCH-MODE POWER SUPPLIES WITH VOLTAGE REGULATION

CROSS-REFERENCE TO RELATED APPLICATION

This application claims priority to co-pending U.S. Provisional Application entitled "Health Monitoring in Switch-Mode Power Supplies with Voltage Regulation" having Ser. No. 60/831,310 filed Jul. 17, 2006, which is entirely incorporated herein by reference.

STATEMENT REGARDING FEDERALLY SPONSORED RESEARCH OR DEVELOPMENT

This invention was made in part with Government support under contract NNA06AA22C awarded by NASA Ames Research Center. The Government may have certain rights in this invention.

FIELD OF THE INVENTION

The present invention is generally related to detecting fault-to-failure signatures as precursors to failure of electronic devices; and is particularly related to detecting fault-to-failure signatures as precursors to failure of an optical isolator.

BACKGROUND OF THE INVENTION

Prognostic methods are used to improve the reliability of deployed systems by looking at components that have high failure rates and critical impact on performance within the systems. Detectors, or sensors, monitor these systems and look for failure precursors that indicate the high-failure rate components have entered a wear-out mode and are degrading toward failure. By knowing the progression of failure dynamics for a device, an accurate prediction of time to failure or remaining useful life (RUL) can be made and an appropriate maintenance action, such as remove and replace the device, can be initiated to avoid system failure during a time of operation. Fault-to-failure signature detection is a method or capability to detect and report a precursor-to-failure or incipient fault condition of a component device or assembly containing the component. Such detection is the basis for a notification capability to provide early warning of degradation and eventual failure.

A direct approach is to place sensors at the board level at each node of each component having a significant rate of failure: faults are detected and tracked. In many cases, there are interdependencies in these tracking measurements that require an expert system to produce RUL estimates with greater accuracy. This direct approach is invasive because it requires internal access to components within the system: adding sensors inside the power supply imposes an additional reliability load. Manufacturers of switch-mode power supplies can be reluctant to enable prognostics on their supplies, believing that the benefits of this capability do not justify the cost and/or that these benefits do not outweigh the additional reliability burden. Currently, this direct approach to prognostics has not been adopted in many applications. A non-invasive approach uses external access methods, such as using an output voltage terminal, to attach electronic equipment to measure values, inject stimuli and sense responses.

FIG. 1 is a simplified block diagram of a switch mode power supply, (hereinafter "SMPS") 1, in accordance with the known prior art. The SMPS 1 has a direct voltage input 3. A SMPS uses relatively high-frequency switching devices, such as a power Metallic Oxide Semiconductor Field Effect Transistor (hereinafter "MOSFET") switch, sometimes contained within a circuit. In FIG. 1, the MOSFET switch is contained within a Pulse Width Modulator (hereinafter "PWM") 5. Switching frequencies of one-hundred-thousand Hertz (100 kHz) or higher are used to convert the input direct voltage to a first pulsed waveform 7. One or more high-frequency transformers in Isolation device 9 with one or more outputs are used to provide an isolation barrier and to buck or boost the first pulsed waveform 7 to a second pulsed waveform 11 having a different voltage amplitude. The second pulsed waveform 11 is rectified and filtered by an output filter 13 to produce one or more direct voltages with a positive terminal 15A and a negative terminal 15B at voltage levels different from the direct voltage input 3. Feedback is provided through the use of either a small pulse transformer or an opto-isolator in a feedback circuit 17. The feedback circuit 17 produces feedback output 19 to PWM 5 to control the pulse width or pulse frequency or both of the switching devices in the PWM 5 to regulate the output direct voltage across the terminals 15A and 15B.

FIG. 2 is a schematic diagram of an opto-isolator 21 from the feedback circuit 17 of FIG. 1, in accordance with the known prior art. Referring to FIG. 1 and to FIG. 2, in an SMPS 1, there are three components that are at the root of the majority of failures: (1) an output capacitor in the output filter 13, (2) a power MOSFET switch in either or both the Pulse Width Modulator 5 and the Isolation device 9, and (3) an opto-isolator in the feedback circuit 17. The basic operation of an opto-isolator 21, as shown in FIG. 2, is the following: an input current flows into a first opto-isolator input terminal 23A, through a light-emitting diode 25 and out through a second opto-isolator input terminal 23B; the current flow through the light-emitting diode 25 produces light 27; the produced light 27 causes current to flow in the base of an opto-isolator transistor 29, which causes current to flow through the opto-isolator transistor 29 via output terminals 31A and 31B. The input current to the opto-isolator 21 is the result of circuitry to which the opto-isolator 21 is connected in feedback circuit 17 in FIG. 1; the collector at the top of the opto-isolator transistor 29 is connected to circuitry in the Pulse Width Modulator 5 shown in FIG. 1.

The ratio of the output current to the input current of an opto-isolator 21 is defined as the Current Transfer Ratio (CTR) of the opto-isolator 21. Feedback circuits 17 are designed to cause a regulated and set direct output voltage, $V_{DC}$, across output terminals 15A and 15B in FIG. 1. The design of the feedback circuit 17 is predicated on a CTR greater than 1. As an opto-isolator 21 is stressed during operation, for example by heat or current, the crystal lattice of the semiconductor material comprising the opt-isolator 21 may develop defects, especially point defects. Thus, the opto-isolator 21 is damaged. Such defects reduce the light emitting efficiency of the light-emitting diode 25, and the amplification factor of the opto-isolator transistor 27 is reduced, which reduces the CTR. When the CTR is reduced, the opto-isolator 21 is said to be operating in degraded state. When the stress conditions are removed, the crystal lattice self-anneals and most, but not all, of the lattice damage is repaired. After repeated cycles, the CTR is gradually reduced so low that the SMPS 1 fails to correctly regulate the direct output voltage, $V_{DC}$, and the SMPS 1 is deemed to be defective. A defective SMPS 1 is typically removed and replaced, with the removed SMPS 1 being set aside for subsequent testing, evaluation and repair. Because it is set aside, the stress conditions are removed, the opto-isolator 21 self-anneals and the CTR increases. Often the increase in the CTR is sufficient to result in correct voltage regulation during a re-test, and the SMPS 1 is evaluated as not being defective. This intermittent fault behavior, defective in operation but okay during re-test, is a major contributor to a high number of SMPS's being swapped out as defective and being returned to regular usage after maintenance fails to duplicate the defective behavior.

The primary fault-to-failure progression of an opto-isolator 21 is a gradual decrease over time of the current transfer ratio (CTR) from a value greater than 1.0 and typically less than 3.0 to a value below 0.2. As the CTR decreases, the ability of the SMPS 1 to regulate the direct output voltage $V_{DC}$ degrades until the SMPS 1 is unable to adequately regulate the direct output voltage $V_{DC}$. Of interest are the following: (1) the identification and characterization of a fault-to-failure progression signature for opto-isolators 21 in feedback loops of SMPS's 1; (2) a method to use the fault-to-failure progression signature in the design and implementation of a non-invasive sensor for prognostication of opto-isolators 21 in the feedback loop; and (3) a measure of time remaining before the CTR will decrease to a value so low as to cause the power supply to fail to regulate the direct output voltage $V_{DC}$.

There are a number of prognostic methods to identify failure precursors in switching power supplies that rely on internal or external measurements. One known method is to monitor ripple voltage at the output terminals of the power supply as discussed in Layyani, "Failure Prediction of Electrolytic Capacitors of a Switch Mode Power Supply, IEEE Transactions on Power Electronics, Vol 13, No. 6, November 1998. The precursor to failure of the method of Layyani is an increase in ripple voltage caused by increasing degradation of the capacitor as it fails.

A second method disclosed in U.S. Pat. No. 4,245,289, to Mineck, is to measure the duty cycle modulated by an integrated circuit (IC) component that is responsible for switch timing in a regulated power supply. Mineck is based on the premise that electronic components consume more power as they begin to fail. Overall efficiency decreases with the increased power consumption. As the output is regulated to produce a predetermined and set value, the switching duty cycle must compensate by changing the relative on- and off-times. The precursor-to-failure utilized in Mineck is an increase in duty cycle. The method of Mineck is non-specific with regard to exactly which component is failing. Furthermore, the method of Mineck is invasive because it requires measurement of an internal node voltage waveform.

An obvious prognostic method might be to measure the difference between the actual direct output voltage and a designed-for direct output voltage set point. Any trend in the difference value indicates that the power supply is degrading along a trajectory toward failure; but as a prognostic or precursor to failure for an opto-isolator 21, this approach is limited because the SMPS 1 will continue to regulate the direct output voltage up to the point where the opto-isolator 21 actually fails: there is an absence of any precursor to failure from the direct output voltage.

None of the discussed prior art methods have the ability to detect increasing degradation in the operation of an opto-isolator 21 in a feedback loop of a SMPS 1, and there is no known method or means to predict the failure of this component using only measurement at external nodes, such as the direct output voltage terminal of the SMPS 1.

There are existing patents concerned with monitoring of the direct output voltage and feedback circuits 17. In those cases, the monitoring is used for control and provides no information regarding the health of the feedback components. These inventions are in a different category from the prognostic inventions. There are also patent applications related to processing of monitored data in switching supplies, such as US patent application publication no. 20050289378 in which an integrated circuit approach for multi-parameter monitoring is proposed. Patent application publication no. 20030039129 detects an abrupt load change and is implemented as part of a strategy to reduce overshoot and improve overall transient response.

SUMMARY OF THE INVENTION

Embodiments of the present invention provide a system and method for estimating a remaining useful life of a switch mode power supply having an initial, non-zero load current. Briefly described, in architecture, one embodiment of the system, among others, can be implemented as follows. The system includes a current injection device in electrical communication with the switch mode power supply. The current injection device is positioned to alter the initial, non-zero load current when activated. A prognostic control is in communication with the current injection device, controlling activation of the current injection device. A frequency detector is positioned to receive an output signal from the switch mode power supply and is able to count cycles in a sinusoidal wave within the output signal. An output device is in communication with the frequency detector. The output device outputs a result of the counted cycles.

The present invention can also be viewed as providing methods for estimating a remaining useful life of a switch mode power supply having an initial, non-zero load current. In this regard, one embodiment of such a method, among others, can be broadly summarized by the following steps: detecting a damped ringing response to a change in the load current; counting a plurality of cycles in the damped ringing response; and outputting the plurality of cycles count, whereby the plurality of cycles count is indicative of damage to the switch mode power supply and at least one opto-isolator therein.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 3:
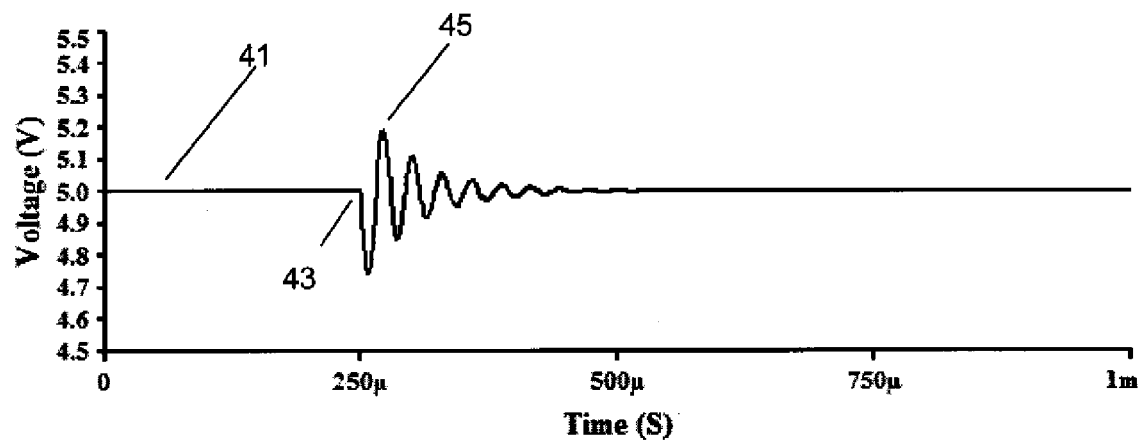
FIG. 3 is a line plot showing a ringing response, such as that in response to an abrupt change in current, on a 5.0 V output voltage of a SMPS.

An abrupt current change in an SMPS, such as that caused by a sudden change in the effective load resistance, will result in a damped ringing response on the output voltage. FIG. 3 is a line plot showing a ringing response, such as that in response to an abrupt change in current, on a 5.0 V output voltage of a SMPS. An SMPS has at least one direct voltage 41 as an output, which in this example is 5.0 V. At time 250 microseconds, an abrupt change in current occurs, which causes a damped ringing response. The damped ringing response begins with a ringing voltage change 43. The damped ringing response is a series of sinusoidal waves 45 at a constant resonant frequency and decreasing amplitude. The damped ringing response is almost completely damped at time around 500 microseconds in this exemplary embodiment, after which the SMPS again outputs a direct voltage of 5.0 V.

The SMPS output shown in FIG. 3 can be modeled by the following expression: (EQ. 1): $V_O = V_{DC} + A_R \{\exp(-t/\tau)\} \{\cos(\omega t + \phi)\}$ where $V_{DC}$ is the direct voltage 45 output of the SMPS; $A_R$ is the peak amplitude of the dampened ringing response; t is time; $\tau$ is the dampening time constant; (EQ. 2): $\omega = 2\pi f_R$ where $f_R$ is the resonant frequency of the dampened ringing response; and $\phi$ is the phase shift of the resonant frequency. The terms $A_R$, $\tau$ and $\omega$ are complex expressions dependent primarily upon the exact topology of the SMPS, especially the feedback loop; the current mode of the SMPS (continuous current flow or discontinuous current flow); and the type of the abrupt current change (impulse or step). For continuous current mode and an impulse type of current change, the terms become the following:

$$A_k = -Z_{out} \Delta I \frac{A}{A+1} \left( \frac{1}{\omega_0 \sqrt{1 - \frac{1}{4Q^2}}} \right), \quad \text{(EQ. 3)}$$

$$\tau = \left( \frac{2Q}{\omega_0} \right), \quad \text{(EQ. 4)}$$

$$\omega = \omega_0 \sqrt{1 - \frac{1}{4Q^2}}, \quad \text{(EQ. 5)}$$

$$\omega_0 = \sqrt{A+1} \left( \frac{1}{\sqrt{LC}} \right) \text{ and} \quad \text{(EQ. 6)}$$

$$Q = \sqrt{A+1} \left( \frac{1}{R} \sqrt{\frac{C}{L}} \right). \quad \text{(EQ. 7)}$$

The derivation of these expressions and terms are not pertinent to the present invention: what is pertinent is they show the amplitude, the duration of the ringing and the frequency of the ringing response are related to and dependent upon the gain (A), resistance (R), capacitance (C) and inductance (L) of the feedback loop of the SMPS.

As indicated by these equations and expressions, there are three variables that change in response to an abrupt stimulus such as an abrupt change in load current: amplitude, dampening time and ring frequency. Of these three, the dampening time and the ring frequency are particularly amenable to prognostication methods.

Figure 4:
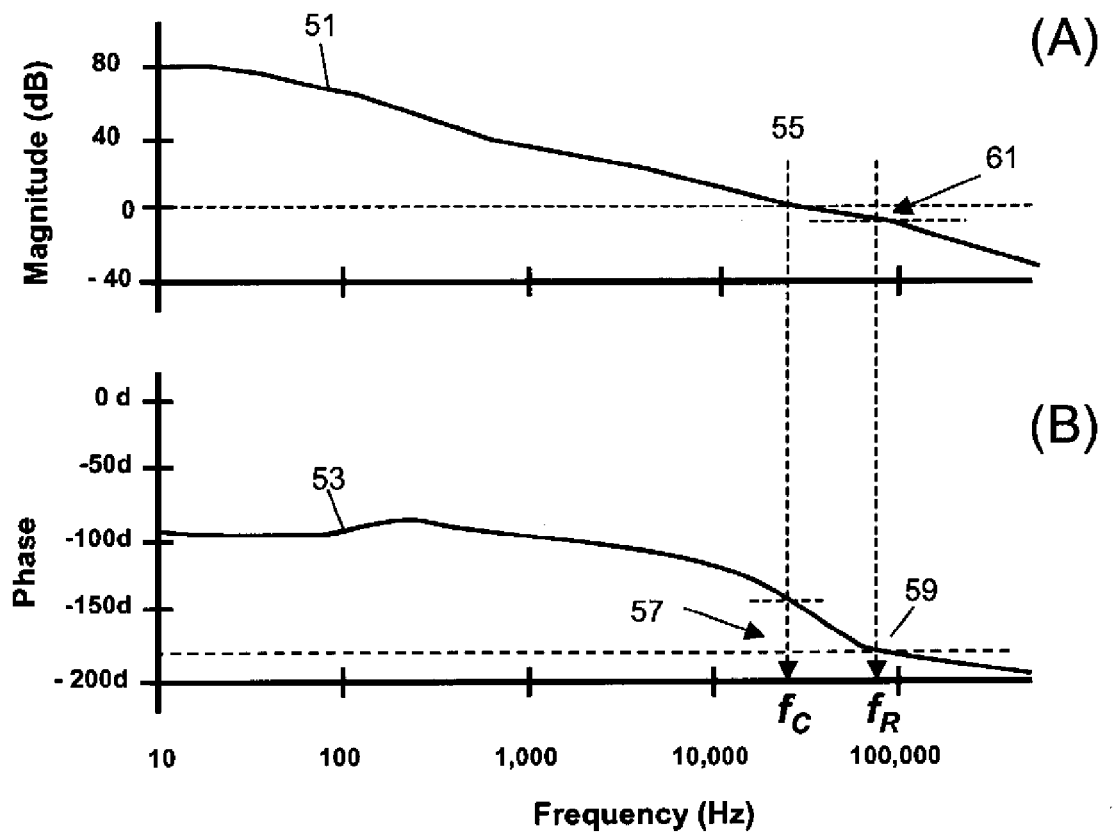
FIG. 4 is a line plot of the gain (A) in dB and the phase (B) in degrees of a SMPS versus frequency.

FIG. 4 is a line plot of the loop gain 51 (A) in dB and the phase 53 (B) in degrees of an exemplary SMPS versus frequency. The crossover frequency 55 is the frequency ($f_C$) at which the loop gain 51 is 0 dB. For the SMPS to be stable, the phase margin 57 (180 degrees minus the absolute value of the phase) must be positive and greater than some design margin (for instance, 45 degrees). The SMPS represented by the plots in FIG. 4 is stable because the phase margin 57 is greater than 45 degrees. The SMPS has a resonant frequency, $f_R$, at point 59 of the phase plot. Resonant frequency is the frequency at which the phase is minus 180 degrees. The SMPS does not oscillate because the gain margin 61 is less than 0 dB at the resonant frequency of the SMPS (gain margin 61 is herein defined as the loop gain 51 at the frequency in which the phase 53 is minus 180 degrees). An abrupt change, such as that induced by an abrupt change in the load current, introduces disruptions that cause the SMPS to begin to oscillate: a ringing response. The SMPS exhibits a damped ringing in response to an abrupt current change because the gain is less than 1 (negative value in dB).

Figure 1:
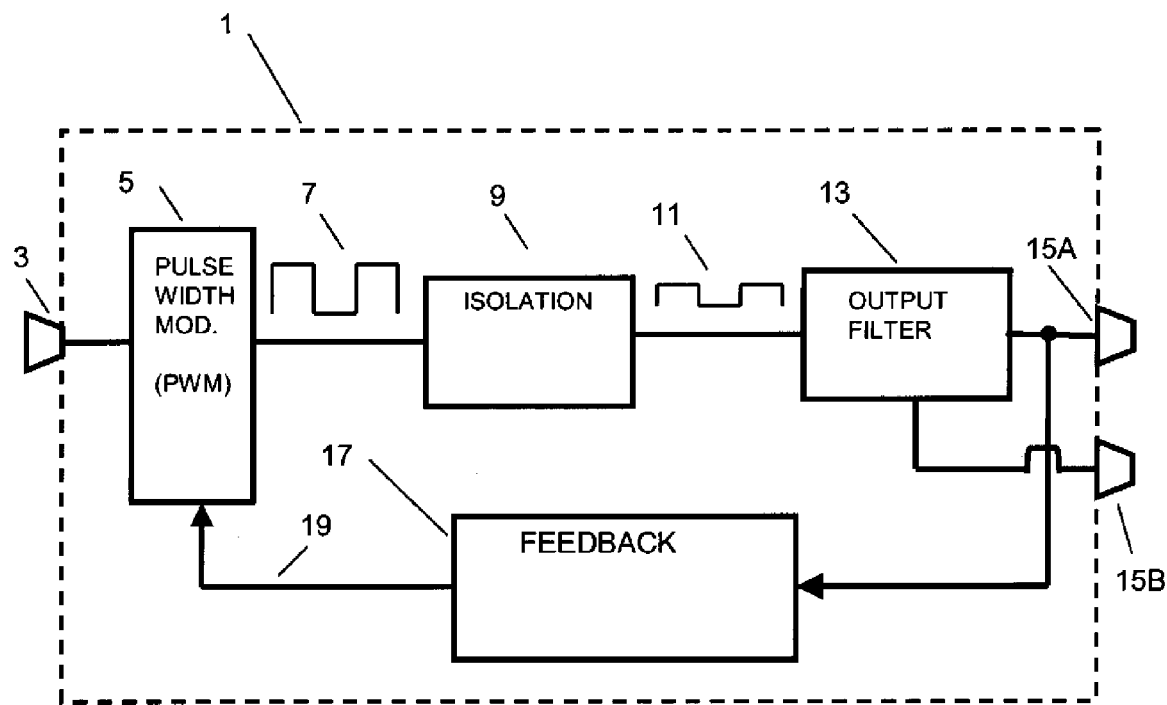
FIG. 1 is a simplified block diagram of a switch mode power supply, in accordance with the prior art.
Figure 2:
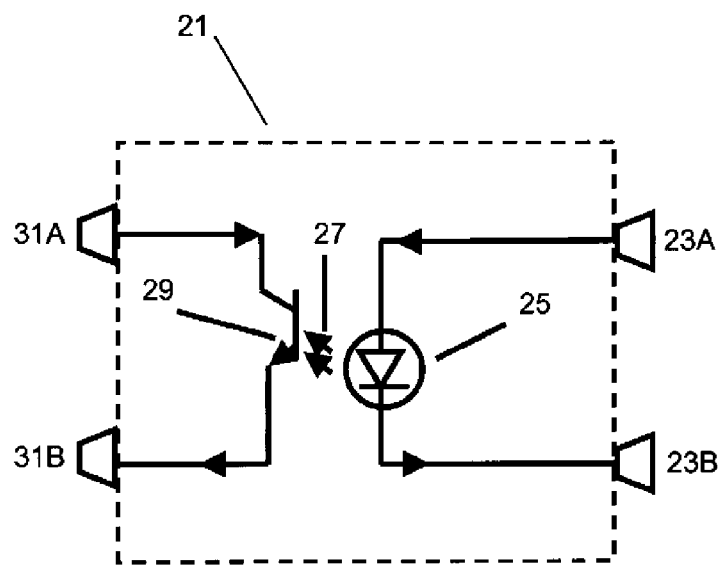
FIG. 2 is a schematic diagram of an opto-isolator from the feedback circuit of FIG. 1, in accordance with the known prior art.
Figure 5:
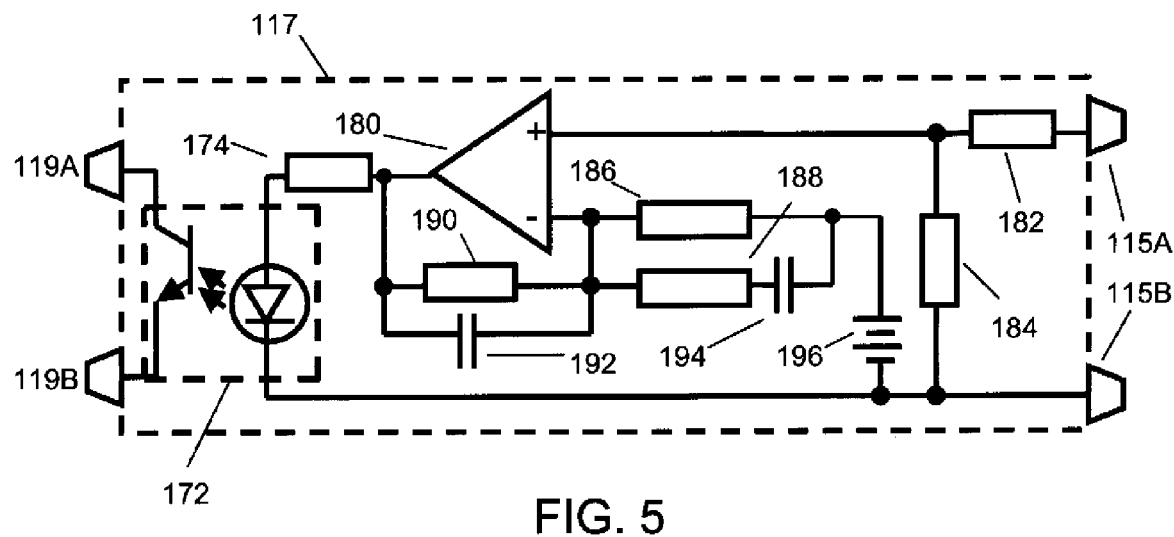
FIG. 5 is a schematic diagram of a first exemplary embodiment of a feedback circuit for a SMPS.

FIG. 5 is a schematic diagram of a first exemplary embodiment of a feedback circuit for a SMPS. The feedback circuit 117 includes input terminals 115A and 115B connected to positive and negative nodes of an output voltage of a SMPS. Output terminals 119A and 119B are connected to a PWM, such as the PWM shown in FIG. 1. Opto-isolator 172, an amplifier, is connected to a load resistor 174, which is connected to the output of a feedback amplifier 180, which may be an operational amplifier. A first input of the feedback amplifier 180 is connected to a voltage divider comprising two resistors 182 and 184 and a second input of the feedback amplifier 180 is connected to an input network including resistors 186, 188, 190, a first capacitor 192, a second capacitor 194, and a biasing voltage 196. The values of the resistors 186, 188, 190 and the biasing voltage 196 determine the overall gain of the feedback amplifier 180. The gain of the feedback amplifier 180 and the gain of the opto-isolator 172 determines the gain of the feedback circuit 117. The capacitors 192, 194 values are chosen to ensure the gain 51 and the phase 53 (both shown in FIG. 4) result in a stable operation. A degradation of gain of the feedback circuit 117 is almost always because of a degradation of gain of the opto-isolator 172 and not because of degradation in the gain of the feedback amplifier 180.

Figure 6:
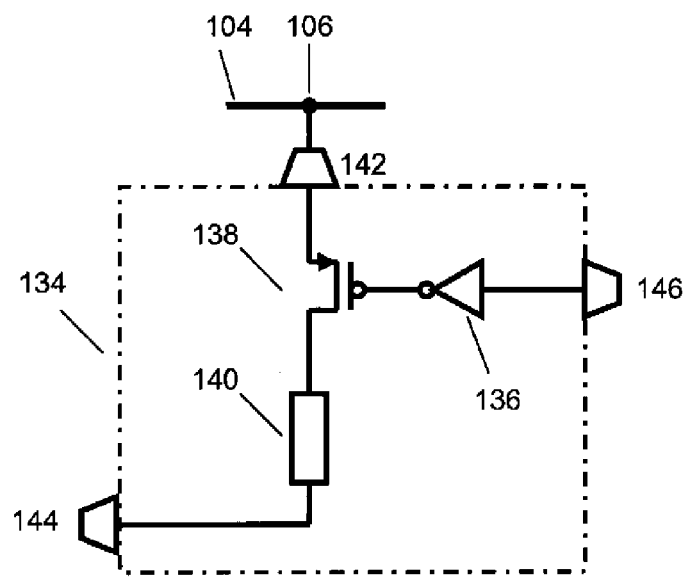
FIG. 6 is a schematic diagram of an exemplary current injection device, in accordance with a first exemplary embodiment of the present invention.

FIG. 6 is an exemplary current injection device 134, in accordance with a first exemplary embodiment of the present invention. The current injection device 134 includes an injection inverter 136, an injection switch 138 having a P-channel power MOSFET and a injection load resistor 140. The current injection device 134 has a first terminal 142 that is connected to a voltage output bus 104 at first connection point 106. A second terminal 144 is connected to terminal 115A or terminal 115B (shown in FIG. 5). When an input 146, connected to the injection inverter 136, is positive, the injection inverter 136 turns on the injection switch 138 to connect the injection load resistor 140 to the voltage output bus 104 at first connection point 106. The result of the positive input 146 is an abrupt change in the load current of the SMPS (such as the prior art SMPS shown in FIG. 1), which results in a damped ringing such as that shown in FIG. 3. The current injection device 134 is able to inject an abrupt current change of known duration and it injects a current change of known amplitude, which is the output voltage at the voltage output bus 104 divided by the value of the injection load resistor 140.

Figure 7:
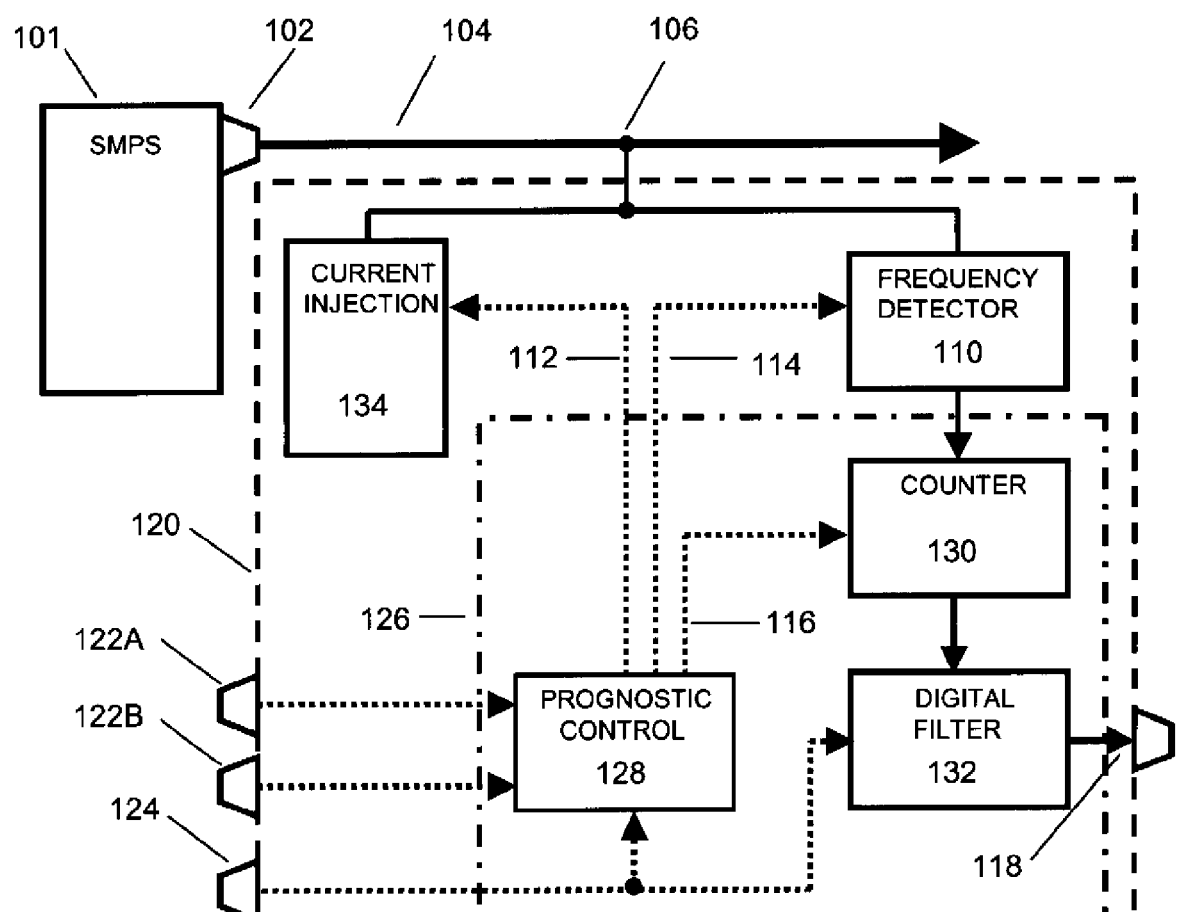
FIG. 7 is a block diagram of a SMPS health monitor connected to the output voltage bus of a SMPS, in accordance with a first exemplary embodiment of the present invention.

FIG. 7 is a block diagram of a SMPS health monitor 120 connected to the output voltage bus 104 of a SMPS 101, in accordance with a first exemplary embodiment of the present invention. The SMPS 101 has a voltage output terminal 102, which can be either the positive or the negative terminals 115A, 115B shown in FIG. 5 (in the first exemplary embodiment, a positive output terminal is shown). The voltage output terminal 102 connects to the output voltage bus 104 to which are attached electronic assemblies at the first connection point 106. The SMPS health monitor 120, which has a mode input 122A, a run input 122B, a filter selection input 124 and a digital output 118. The SMPS health monitor 120 also includes digital logic 126 having a prognostic control 128, a counter 130, and a digital filter 132. SMPS Health Monitor 120 also includes the current injection device 134 and an analog input frequency detector 110. The prognostic control 128 operates in at least one of two modes, monitor or self-test, as may be determined by the mode input 122A.

Still referring to FIG. 7, when the run input signal 122B is received and the prognostic control 128 is operating in monitor mode, the prognostic control 128 sends an inject control 112 to the current injection device 134, which causes an abrupt current change at the first connection point 106. Then the prognostic control 128 sends a frequency-gate control 114 to the frequency detector 110, which detects the analog negative swings of the damping ringing response. The detected analog negative swings are amplified by the frequency detector 110 and sent as digital pulses to the counter 130, which counts the pulses. The count of the number of pulses caused by the damping ringing response is sent to the digital filter 132, which filters the digital count to produce a prognostic output 118. The prognostic output 118 indicates the level of degradation of the feedback loop in the SMPS 101, with the degradation most likely being due to degradation in CTR of the opto-isolator 172 in the feedback loop. A clock input 125 is used by digital logic 126.

Figure 8:
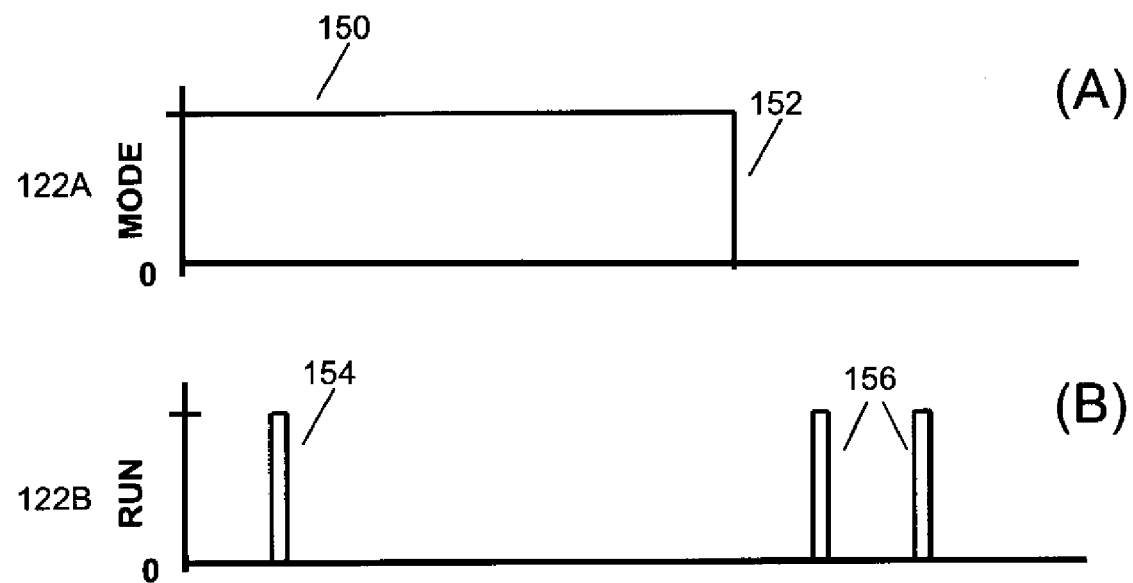
FIG. 8 is a line plot of the mode input and the run input signals received by the SMPS health monitor of FIG. 7, in accordance with the first exemplary embodiment of the present invention.

FIG. 8 is a line plot of the mode input 122A and the run input 122B signals received by the SMPS health monitor 120 of FIG. 7, in accordance with the first exemplary embodiment of the present invention. The mode input 122A has two values: when mode is positive 150, the SMPS health monitor 120 is in monitor mode and will inject an abrupt current change to the SMPS 101 whenever the run input 122B is a positive pulse 154. When mode is initially pulled low 152, the SMPS health monitor 120 is placed in self-test mode and the prognostic control 128 sends a reset signal to the counter 130. Whenever run input 122B is a positive pulse 156 and the mode is self-test, the counter 130 is incremented by one. The self-test mode enables verification of correct operation of the counter 130 and the digital filter 132.

Figure 9:
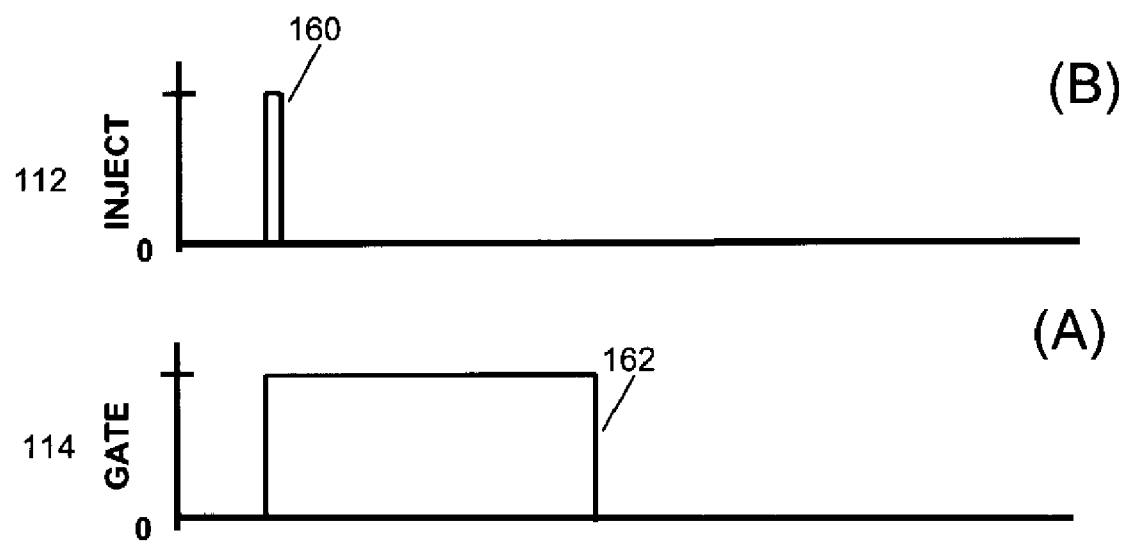
FIG. 9 is a line plot of the mode-inject control and the frequency-gate control signals received by the SMPS health monitor of FIG. 7, in accordance with the first exemplary embodiment of the present invention.

FIG. 9 is a line plot of the mode-inject control and the frequency-gate control signals received by the SMPS health monitor of FIG. 7, in accordance with the first exemplary embodiment of the present invention. The positive pulse 154 of run input 122B in FIG. 8(B) causes the prognostic control 128 to generate the inject control 112, which is the first control pulse 160. The prognostic control 128 also generates the frequency-gate control 114 as shown by second control pulse 162.

Figure 10:
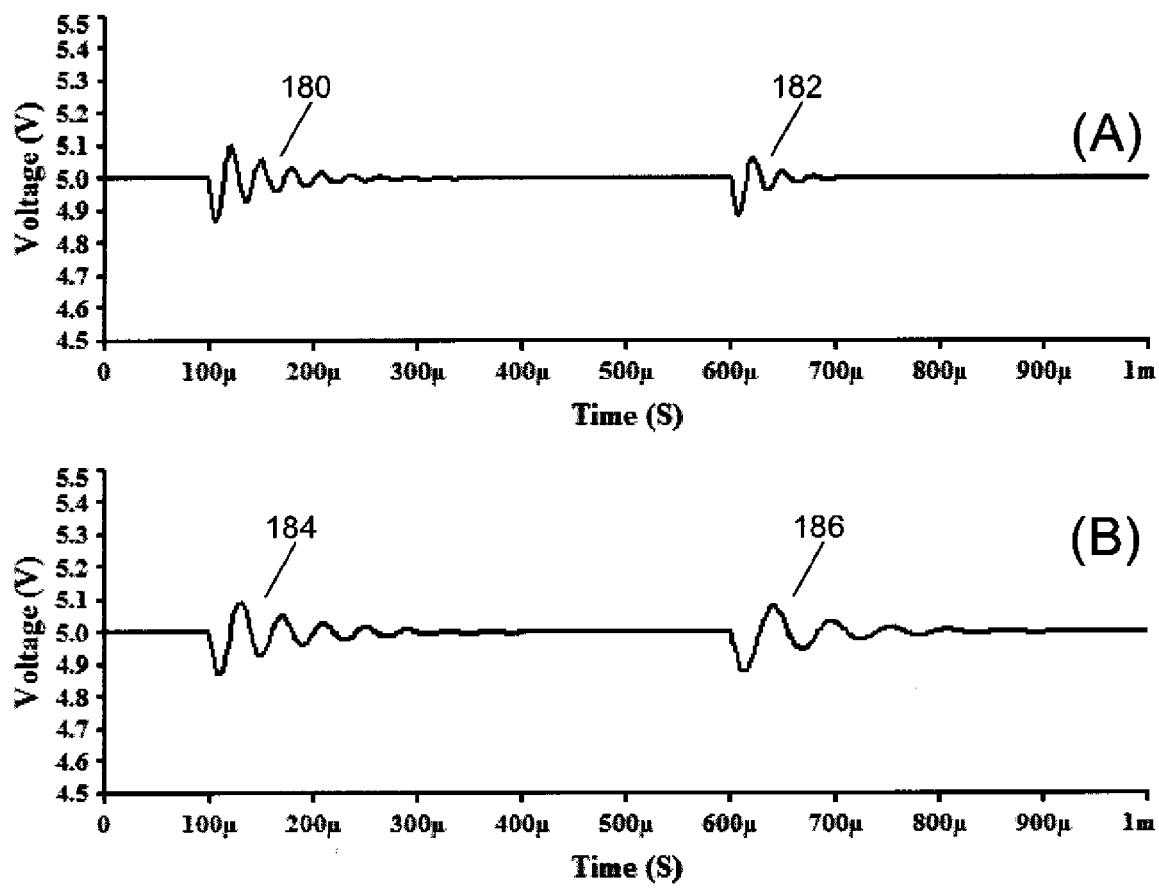
FIG. 10 shows two significant types of damped ringing responses, fixed frequency (A) and variable frequency (B), in accordance with the first exemplary embodiment of the present invention.

FIG. 10 shows two significant types of damped ringing responses, fixed frequency (A) and variable frequency (B), in accordance with the first exemplary embodiment of the present invention. When an opto-isolator 172 degrades, an abrupt current change causes one of two significantly different types of fault-to-failure progression (FFP) signatures. The first type of FFP signature is characterized by a significant change in the dampening duration of the response as seen by the difference in a longer response 180 compared to a shorter response 182. The difference is predicted by equations EQ. 1, EQ. 4 and EQ. 7. There is a significant difference in the number of detectable cycles between the longer response 180 and the shorter response 182. A reduction in amplitude, as predicted by equations EQ.1 and EQ. 3, is also seen, and such amplitude reduction also contributes to the reduction in the number of detectable cycles of ringing.

The second type of FFP signature is characterized by a significant reduction in the frequency of the ringing as seen by the difference in a quicker response 184 compared to a slower response 186. The change in frequency is predicted by equations EQ. 1, EQ. 5 and EQ. 6. As seen comparing the quicker response 184 and the slower response 186, there is a significant difference in the number of detectable cycles of ringing. Whether there is or is not also a change in dampening time or ringing amplitude is not significant, because any such change also contributes to the reduction in the number of detectable cycles of ringing. This reduction in the number of detectable cycles of ringing is directly related to a reduced gain in the feedback loop, and the gain reduction is likely due to a reduced CTR of the opto-isolator 172, and the reduced CTR is due to degradation in the opto-isolator 172. The exploitation of the reduction in the number of detectable cycles of ringing frequency due to a reduction in amplitude and/or frequency and/or dampening time, all which are the result of reduced gain, as the opto-isolator 172 in the feedback loop degrades is an important element of the present invention.

Figure 11:
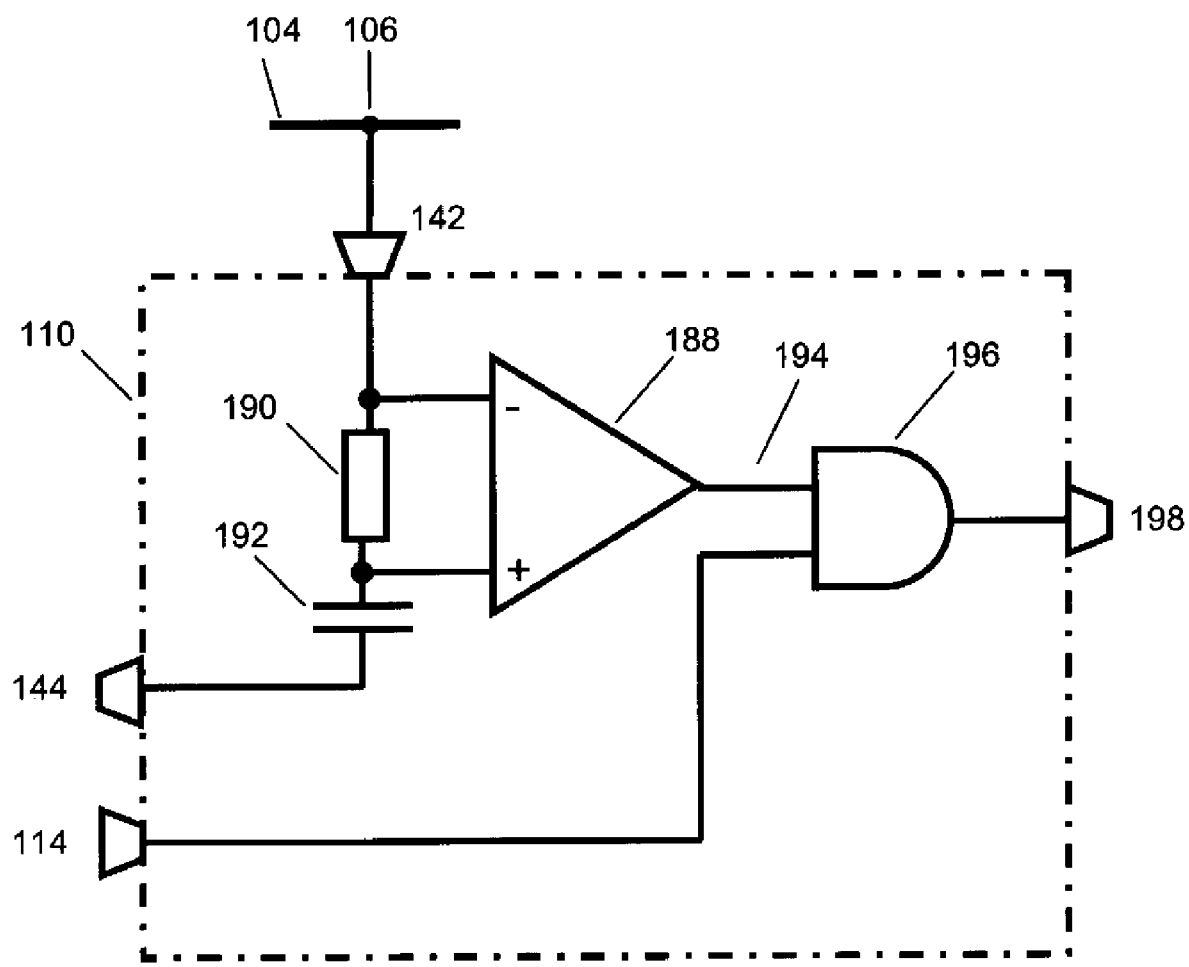
FIG. 11 is a schematic diagram of the ring frequency detector for the SMPS health monitor shown in FIG. 7, in accordance with the first exemplary embodiment of the present invention.
Figure 12:
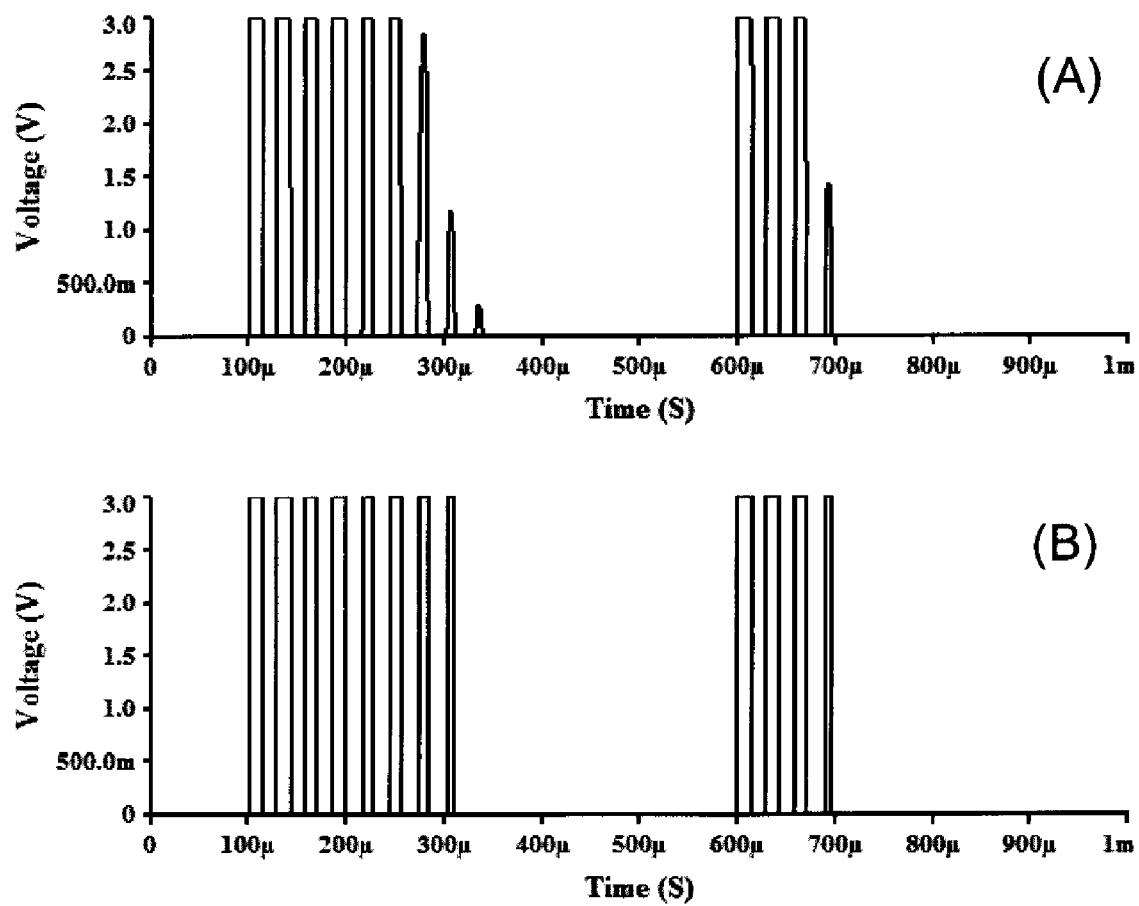
FIG. 12 is a line plot of the analog and the digitized result of the output of the ring frequency detector for a fixed-frequency damped ringing response for a "no degradation" and an "intermediate degradation" condition.
Figure 13:
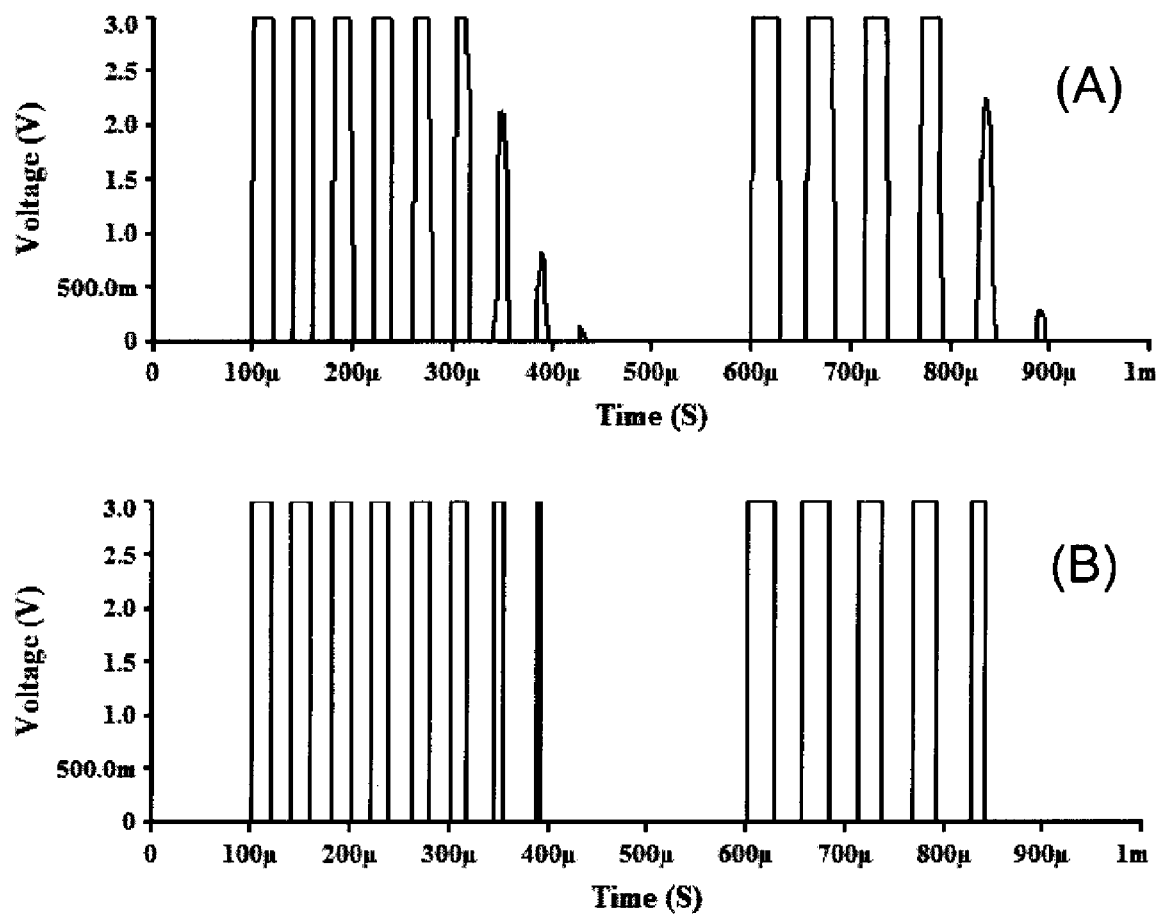
FIG. 13 is a line plot of the analog and the digitized result of the output of the ring frequency detector for a variable-frequency damped ringing response for a "no degradation" and an "intermediate degradation" condition.

FIG. 11 is a schematic diagram of the frequency detector 110 for the SMPS health monitor 120 shown in FIG. 7, in accordance with the first exemplary embodiment of the present invention. The frequency detector 110 includes a differential input amplifier 188, a detector resistor 190, a detector capacitor 192 and an AND logic gate 196. The frequency detector 110 is attached to the first and second terminals 142, 144 of the current injection device 134 (shown in FIG. 6). The detector resistor 190 and the detector capacitor 192 filters out the damped ringing frequency on the direct voltage at the first connection point 106 of voltage output bus 104 to provide a direct voltage to the positive input of the differential input amplifier 188. This filtering and the direct connect of the negative input of the differential input amplifier 188 to the first connection point 106 results in the differential input amplifier 188 outputting positive pulses corresponding to the negative swings of the sinusoidal waves in the damped frequency response. The output 194 of the differential input amplifier 188 is ANDed by the AND logic gate 196 and the frequency gate control 114. The output 194 of the differential input amplifier 188 to the ringing frequency responses 180, 182 shown in FIG. 10A, is shown in FIG. 12A and the output 198 of the AND logic gate 196 is shown in FIG. 12B. The output 198 is sent to the counter 130 (shown in FIG. 7), which results in a count of 8 and a count of 4 being input to the digital filter 132 (shown in FIG. 7). Similarly, the output 194 of the differential input amplifier 188 to the ringing frequency responses (shown in FIG. 10B) is shown in FIG. 13A and the corresponding output 198 of the AND logic gate 196 is shown in FIG. 13B. The output 198 of the AND logic gate 196 is sent to the counter 130 (shown in FIG. 7), which results in a count of 8 and a count of 5 being input to the digital filter 132 (shown in FIG. 7). The digital filter 132 would produce a prognostic health signal corresponding to no degradation when the count is maximum, maximum degradation when the count is 0 or 1, and intermediate levels of degradation for counts between the maximum and a count of one.

The digital logic 126 (shown in FIG. 7) is easily realized by using a hardware description language (HDL), such as Verilog, to program a field programmable gate array (FPGA). The implementation of the digital logic 126 is not described herein, although one having ordinary skill in the art would be able to implement the digital logic 126 herein described without undue experimentation. The digital logic 126 may include the methods, as previously described, to control and sequence the abrupt current change, the gating of the frequency detector to produce pulses corresponding to frequency cycles in the damped frequency response, the counting of those pulses and the outputting of prognostic health signal levels to indicate no degradation, maximum degradation and intermediate levels of degradation. These output signal levels provide a prognostic progression from no degradation to maximum degradation; the prognostic progression plus evaluation of the times it takes to progress from one level to the next provide the basis for producing accurate RUL estimates.

The digital logic 126 can then be implemented by synthesizing a Verilog program and loading the synthesized program into, for example, a Field Programmable Gate Array or by using the synthesized output to create a digital schematic that can be implemented as an integrated circuit or as a collection of discrete digital gates. Referring to FIG. 7, an exemplary behavioral level of a program is the following:

1. When the mode input 122A is at a positive edge, send a digital reset to the counter 130 and pull the controls 112, 114 inactive low.
2. When the mode input 122A is at a negative edge, send a digital reset to the counter 130.
3. When the mode input 122A is active high and a positive pulse is received at the run input 122B, send a positive pulse through inject control 112 to the current injection 134 to cause the injection of an abrupt change in SMPS 101 load current. Also send a reset pulse to the counter 130, also send a positive frequency-gate control 114 to the frequency detector 110, with the length of the frequency-gate control 114 being for a predetermined number of digital clock cycles, with the number corresponding to the expected maximum dampening time of the damped ringing response.
4. When the mode input 122A is inactive low and a positive pulse is received at the run input 122B, send a test increment count signal to the counter 130 to create an increasing test count to the digital filter 132.
5. For each digital value of the input bits 124 to the prognostic control 128, enable a predetermined number of clocks cycles to control the width of the frequency-gate control 114.
6. For each digital value of the input bits 124 to the digital filter 132, enable a corresponding set of combinational logic gates to transform a count from the counter 130 to a predetermined prognostic health signal.
7. Define a set of combinational logic gates for each supported SMPS 101 or group of SMPS 101.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

The invention claimed is:

1. A method for producing prognostic health signals that are indicative of a CTR of at least one opto-isolator used in at least one feedback loop of a switch mode power supply, the method comprising the steps of:
    detecting a damped ringing response;
    producing a train of pulses representative of at least one of a frequency and a dampening time of the damped ringing response;
    counting waves of said train of pulses;
    digitally filtering the wave count to produce at least one output prognostic signal; and
    wherein said output prognostic signal is indicative of a number of detectable cycles of a sinusoidal frequency in the damped ringing response, whereby the number of detectable cycles is useful for determining a remaining useful lifetime of the opto-isolator.

2. The method of claim 1, further comprising injecting an abrupt change in SMPS load current, said abrupt current change being of known amplitude and duration.

3. The method of claim 1, further comprising the steps of:
    injecting an abrupt change in SMPS load current to induce the damped ringing response;
    gating the detection of the damped ringing response, said gating to occur temporally proximate to the beginning of the damped ringing response and said gating to end temporally proximate to a passage of the maximum time for the damped ringing frequency to be detectable; and
    whereby said gating is for the purpose of limiting counting of the train of pulses to a period corresponding to the damped ringing frequency response induced by the injected abrupt change in SMPS load current.

4. The method of claim 1, wherein the step of counting waves of said train of pulses further comprises counting waves of said train of pulses in response to an injected abrupt change in SMPS load current, said counting to be accomplished by a standard digital counter technique.

5. The method of claim 1, further comprising discrete levels of count values for the waves in the train of pulses;
    said count values being directly related to a level of degradation in the gain of the at least one feedback loop in the SMPS;

said count values ranging from a maximum value to a minimum value calibrated SMPS models;

said maximum value corresponding to a detection level of no degradation;

said minimum value corresponding to a detection level of maximum degradation;

said count values between the maximum value and the minimum value corresponding to a plurality of intermediate levels of prognostic health.

6. The method of claim 1, wherein the step of digitally filtering the wave count to produce at least one output prognostic signal further comprising filtering discrete count values to produce a plurality of prognostic health signals;

said prognostic health signals being discrete digital signals;

said discrete prognostic health signals representing a range from "no detected degradation" to "maximum detected degradation;"

said discrete prognostic health signals including a plurality of intermediate levels degradation between no degradation to maximum degradation.

7. The method of claim 1, further comprising selecting a set of count values to be used for producing discrete prognostic health signals.

8. The method of claim 1, further comprising automating the steps of counting and digitally filtering in a self-test mode to monitor operation of the SMPS.

9. A method for estimating a remaining useful life of a switch mode power supply having an initial, non-zero load current, the method comprising the steps of:

detecting a damped ringing response to a change in the load current;

counting a plurality of cycles in the damped ringing response; and outputting the plurality of cycles count, whereby the plurality of cycles count is indicative of damage to the switch mode power supply and at least one opto-isolator therein.

10. The method of claim 9, further comprising the step of digitally filtering the damped ringing response.

11. The method of claim 9, further comprising the step of recording the plurality of cycles count in memory, wherein counts from a plurality of the damped ringing responses are recorded in memory.

12. The method of claim 11, further comprising the step of comparing the plurality of cycles count to at least one previous plurality of cycles count thereby calculating a level of damage to the switch mode power supply.

13. The method of claim 12, further comprising the step of estimating a remaining useful life of the switch mode power supply based on the comparison.

14. The method of claim 9, further comprising the step of injecting an added current into the initial, non-zero load current, thereby causing the damped ringing response.

15. The method of claim 14, wherein the added current is substantially a pulse wave.

16. A system for estimating a remaining useful life of a switch mode power supply having an initial, non-zero load current, the system comprising:

means for detecting a damped ringing response to a change in the load current;

means for counting a plurality of cycles in the damped ringing response; and means for outputting the plurality of cycles count, whereby the plurality of cycles count is indicative of damage to the switch mode power supply and at least one opto-isolator therein.

17. The system of claim 16, further comprising means for recording the plurality of cycles count into memory, wherein counts from a plurality of the damped ringing responses are recorded in memory.

18. The system of claim 17, further comprising:

means for comparing the plurality of cycles count to at least one previous plurality of cycles count thereby calculating a level of damage to the switch mode power supply; and means for estimating a remaining useful life of the switch mode power supply based on the comparison.

19. The system of claim 16, further comprising means for injecting an added current into the initial, non-zero load current, thereby causing the damped ringing response.

20. The system of claim 19, further comprising means for automated monitoring of a degradation level of the switch mode power supply over a time period by repeatedly injecting the added current over the time period.

21. An apparatus for estimating a remaining useful life of a switch mode power supply having an initial, non-zero load current, the apparatus comprising:

a current injection device in electrical communication with the switch mode power supply, wherein the current injection device is positioned to alter the initial, non-zero load current when activated;

a prognostic control in communication with the current injection device, controlling activation of the current injection device;

a frequency detector positioned to receive an output signal from the switch mode power supply and able to count cycles in a sinusoidal wave within the output signal; and an output device in communication with the frequency detector, wherein the output device outputs a result of the counted cycles.

22. The apparatus of claim 21, wherein the result of the counted cycles is estimated remaining useful life of the switch mode power supply.

23. The apparatus of claim 21, further comprising a digital filter in communication with the frequency detector and the output device, wherein the digital filter filters the output from the frequency detector for the output device.

24. The apparatus of claim 21, further comprising a clock in communication with the prognostic control, wherein the prognostic control periodically activates the current injection device to send a pulse wave to the load current of the switch mode power supply.

25. The apparatus of claim 21, wherein the prognostic control is in communication with the frequency detector and wherein the prognostic control activates the frequency detector for a discrete time period substantially coinciding with an anticipated dampening ringing response from the switch mode power supply.

* * * * *